WITNESSES:

INVENTORS
William B. Smith
and Weldon R. Donsbach.
ATTORNEY

United States Patent Office
2,853,608
Patented Sept. 23, 1958

2,853,608
PULSE CIRCUIT

William B. Smith, West Point, Miss., and Weldon R. Donsbach, Baltimore, Md., assignors to Westinghouse Electric Corporation, East Pittsburgh, Pa., a corporation of Pennsylvania Application August 20, 1954, Serial No. 451,118

4 Claims. (Cl. 250—27)

This invention relates to pulse circuits, and more particularly to magnetron pulse circuits which maintain a substantially constant amplitude of magnetron pulse current.

Heretofore, various means have been provided for maintaining the amplitude of the magnetron pulse current substantially constant, even though the magnitude of the input voltage to the magnetron pulse circuit varies. For instance, line voltage regulators have been utilized to maintain the magnitude of the line voltage substantially constant so as to provide a substantially constant amplitude of magnetron pulse current. Spark gaps and overload relays have also been utilized to protect the magnetron from excessive voltage and current surges. However, many of these prior art devices are non-automatic in nature.

An object of this invention is to provide for minimizing variations in the amplitude of magnetron pulse current due to changes in the magnitude of the line voltage, to thereby protect the magnetron from excessive current and reduce frequency and mode variations.

Another object of this invention is to provide for charging a regulating capacitor in accordance with the magnitude of the line voltage applied to a device, and discharging the regulating capacitor at a predetermined rate so that the voltage remaining thereacross functions as a regulating voltage, to thereby maintain the amplitude of the output current of the device substantially constant even though the magnitude of the line voltage varies.

Figure 1:
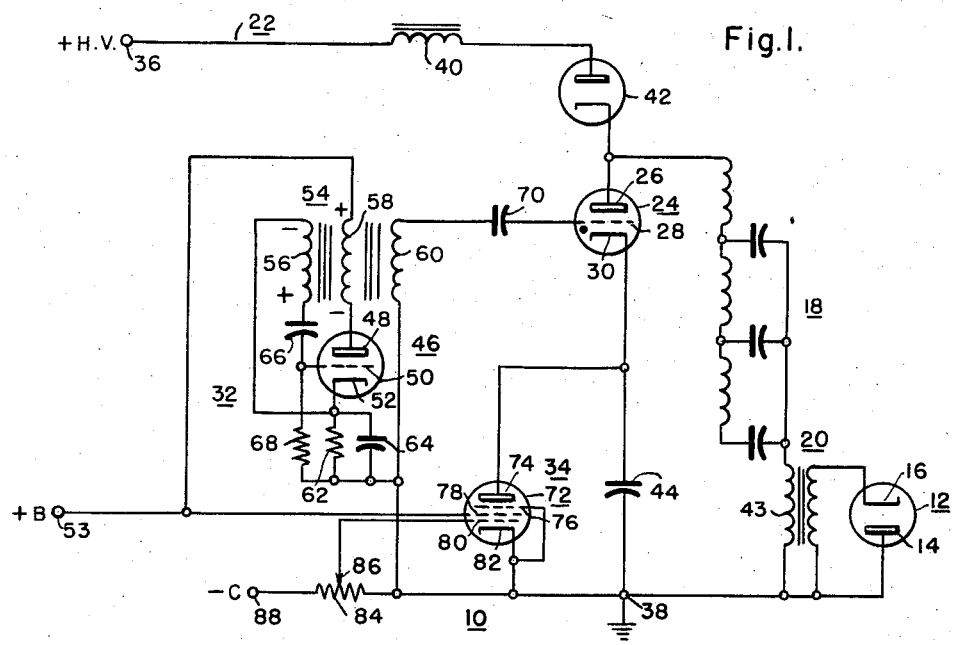
Figure 2:
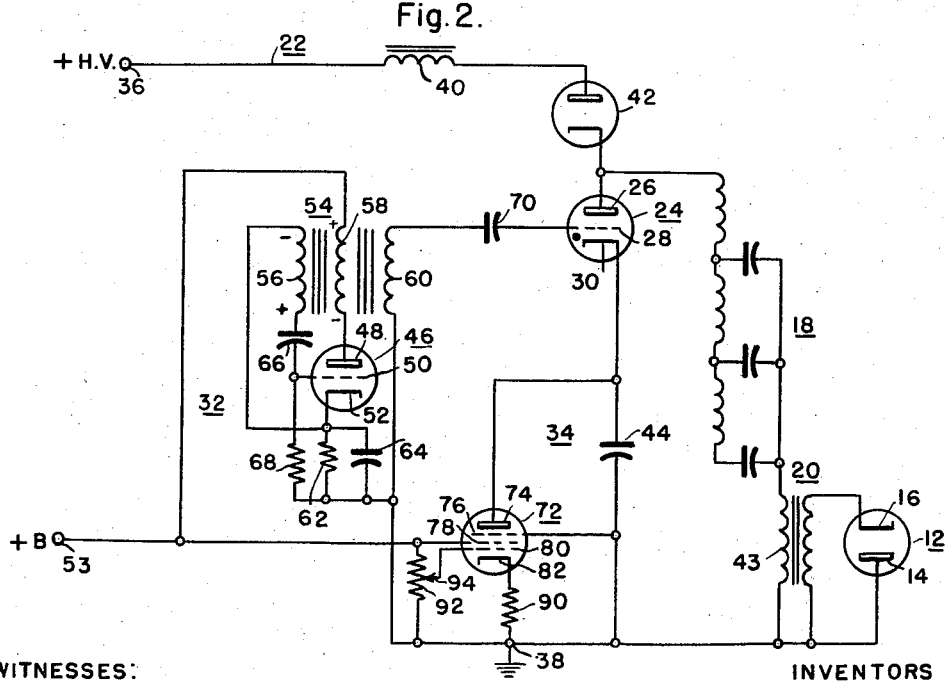

Other objects of this invention will become apparent from the following description when taken in conjunction with the accompanying drawing, in which:

Figure 1 is a schematic diagram of a pulse circuit illustrating one embodiment of the teachings of this invention; and, Fig. 2 is a schematic diagram of another pulse circuit illustrating a further embodiment of this invention.

Referring to Fig. 1, there is illustrated a pulse circuit 10 for supplying a pulse current of substantially constant amplitude to a magnetron 12 having an anode 14 and a cathode 16. By providing a pulse current of substantially constant amplitude to the magnetron 12, excessive current flow through the magnetron 12 is prevented.

In general, the pulse circuit 10 comprises a pulse-forming network 18, a pulse transformer 20 for supplying energy to the magnetron 12, supply means 22 for supplying energy to the pulse-forming network 18 to thereby charge up the pulse-forming network 18, a thyratron 24, having an anode 26, a grid 28, and a cathode 30, for periodically establishing a discharge path for the pulse-forming network 18, a blocking oscillator 32 for periodically triggering the thyratron 24, and a regulator system 34 for maintaining the amplitude of the magnetron pulse current substantially constant and also for preventing excessive magnetron current.

In order to charge up the pulse-forming network 18 to a voltage amplitude of approximately twice the direct-current line or input voltage applied between the terminals 36 and 28 and maintain it at this value, the supply means 22 comprises a charging choke 40 and a charging diode 42. In particular, the upper end of the pulse-forming network 18, as illustrated, is connected through the charging diode 42 and the charging choke 40, to the terminal 36. On the other hand, the lower end of the pulse-forming network 18 is connected to the terminal 38, which in this instance is at ground potential, through the primary winding 43 of the pulse transformer 20.

As hereinbefore mentioned, the thyratron 24 periodically establishes a discharge path for the pulse-forming network 18. This discharge path extends from the upper end of the pulse-forming network 18, as illustrated, through the thyratron 24, when it is in a conducting state, a regulating capacitor 44, and the primary winding 43 of the pulse transformer 20, to the lower end of the pulse-forming network 18, as illustrated. The function of the regulating capacitor 44 will be explained more fully hereinafter.

The blocking oscillator 32 is of a conventional type and functions to supply a trigger pulse to the thyratron 24. As illustrated, the blocking oscillator 32 comprises a triode vacuum tube 46 having an anode 48, a grid 50, and a cathode 52. Anode voltage for the vacuum tube 46 is obtained from the terminals 38 and 53. In particular, the terminal 53 is connected to the anode 48 through the winding 58 of a pulse transformer 54 having windings 56, 58, and 60. On the other hand, the proper cathode bias for the vacuum tube 46 is provided by means of the parallel-connected resistor 62 and capacitor 64. As illustrated, the parallel circuit, including the resistor 62 and the capacitor 64, is connected between the cathode 52 of the vacuum tube 46 and the ground terminal 38.

The operation of the blocking oscillator 32 will now be described. When plate current first flows through the vacuum tube 46, the anode 48 becomes more negative, and the grid 50 becomes more positive. The reason that the grid 50 becomes more positive is because the windings 56 and 58 of the pulse transformer 54 are wound oppositely from one another, as illustrated, by the polarity signs associated with these windings. When the grid 50 becomes more positive, grid current is drawn through a capacitor 66 to thereby charge it up in such a direction that the negative side of the capacitor 66 is connected to the grid 50. Once the vacuum tube 46 reaches plate current saturation, grid current is no longer drawn through the capacitor 66, and the capacitor 66 biases the vacuum tube 46 to cut-off. When the vacuum tube 46 is cut off, the capacitor 66 discharges through a resistor 68. However, once the capacitor 66 has discharged a sufficient amount, the vacuum tube 46 again starts conducting plate current and the cycle is repeated in the same manner as hereinbefore described. Thus, the pulse repetition rate of the blocking oscillator 32 is determined by the electrical values of the capacitor 66 and the resistor 68. It is to be understood that the blocking oscillator 32 may be triggered by an oscillator multivibrator (not shown) or the like to provide a very accurate pulse repetition frequency.

During that portion of the cycle when the magnitude of the plate current of the vacuum tube 46 is increasing, a voltage is induced across the winding 60 of the pulse transformer 54 which is applied to the grid 28 of the thyratron 24. In particular, the upper end of the winding 60, as illustrated, is connected to the grid 28 of the thyratron 24 by means of a coupling capacitor 70.

In accordance with the teachings of this invention, the regulator system 34 maintains the amplitude of the pulse current of the magnetron 12 substantially constant even though the magnitude of the line voltage applied to the terminals 36 and 38 does vary. In general, the regulator system 34 comprises the regulating capacitor 44 and control means 72 connected to the regulating capacitor 44 for discharging the regulating capacitor 44 at a predetermined rate during that time when pulse current is not flowing from the pulse-forming network 18 through the regulating capacitor 44.

In the embodiments illustrated, the control means 72 is an electronic tube, specifically a pentode vacuum tube having an anode 74, a suppressor 76, a screen 78, a grid 80, and a cathode 82. As illustrated, the pentode 72 is connected across the regulating capacitor 44. However, owing to the characteristic of the pentode 72, the magnitude of its plate current remains substantially constant over a wide range of change in the amplitude of its plate voltage, and, thus, over a wide range of change in the amplitude of the voltage appearing across the regulating capacitor 44. This characteristic of the pentode 72 is essential since if the plate current were to vary with changes in the amplitude of the plate voltage, the pentode 72 would not discharge the regulating capacitor 44 at a predetermined rate, but rather at a rate depending upon the instantaneous amplitude of the voltage across the regulating capacitor 44. Thus, in operation, the pentode 72 functions as a constant current discharge device or a constant bleed device whose plate current remains substantially constant.

In order to provide a variable grid bias for the pentode 72, a variable resistor 84, having a slidable contact member 86, is provided. In particular, one end of the variable resistor 84 is connected to the cathode 82 of the pentode 72, and the other end of the variable resistor 84 is connected to a negative supply terminal 88. Grid voltage for the pentode 72 is obtained by connecting the grid 80 to the slidable contact member 86 of the variable resistor 84. By adjusting the position of the slidable contact member 86, the magnitude of the current flow through the pentode 72 can be varied so as to obtain the desired magnitude of plate current flow.

In practice, it is preferable to provide a separate supply for the screen 78 and the grid 80 of the pentode 72, so that changes in the magnitude of the line voltage do not effect an appreciable change in the magnitude of the plate current flowing through the pentode 72. In order to further insure that the plate current of the pentode 72 remains substantially constant, a regulated voltage can be applied to the screen 78 and the grid 80 of the pentode 72.

Since the regulating capacitor 44 is connected in the discharge path for the pulse-forming network 18, the regulating capacitor 44 charges up to a value proportional to the amplitude of the voltage across the pulse-forming network 18. Thus, if the magnitude of the line voltage between the terminals 36 and 38 increases to a value above the normal value, the pulse-forming network 18 charges to a higher amplitude of voltage, and this higher amplitude of voltage across the pulse-forming network 18 effects a charging of the regulating capacitor 44 to a higher value than its normal value during that portion of the time when the thyratron 24 is conducting.

When the thyratron 24 cuts off, due to the discharge of the stored energy in the pulse-forming network 18, the regulating capacitor 44 discharges at a predetermined rate through the pentode 72 until the blocking oscillator 32 again effects a triggering of the thyratron 24. The voltage that appears across the regulating capacitor 44 just before the thyratron 24 is fired is the regulating voltage. The amplitude of this regulating voltage is determined by the initial amplitude of the voltage across the pulse-forming network 18 prior to charging of the regulating capacitor 44, by the repetition rate of the pulses supplied to the thyratron 24 by the blocking oscillator 32, and by the time constant of the regulating capacitor 44 and the pentode.

Since it was assumed that the line voltage between the terminals 36 and 38 increased to a value above the normal value, the amplitude of the regulating voltage appearing across the regulating capacitor 44 likewise increased to a value above its normal value when at the regulated condition. However, the amplitude of the voltage across the pulse-forming network 18 also increased to a value above its normal value when at the regulated condition, and, therefore, since the regulating voltage across the regulating capacitor 44 opposes the voltage across the pulse-forming network 18, the increase in voltage across the regulating capacitor 44 offsets or bucks out the increase in voltage across the pulse-forming network 18, and, therefore, the amplitude of the pulse current through the primary winding 43 of the pulse transformer 20 remains substantially constant. Such being the case, the amplitude of the pulse current of the magnetron 12 likewise remains substantially constant.

On the other hand, if the magnitude of the line voltage between the terminals 36 and 38 decreases to a value below its normal value, the pulse-forming network 18 is charged to a smaller value, and thus the amplitude of its output voltage is, likewise, of smaller value. However, since the regulating capacitor 44 is in the discharge path of the pulse-forming network 18, the regulating capacitor 44 is, likewise, charged up to a lesser value. Then once the pentode 72 effects a partial discharge of the regulating capacitor 44, the regulating voltage across the regulating capacitor 44 is also of lesser magnitude. Therefore, the decrease in the amplitude of the voltage across the pulse-forming network 18 is offset by the decrease in the magnitude of the regulating voltage appearing across the regulating capacitor 44, and thus the amplitude of the magnetron pulse current is maintained substantially constant.

Referring to Fig. 2, there is illustrated another embodiment of the teachings of this invention, in which like components of Figs. 1 and 2 have been given the same reference characters. The main distinction between the apparatus of Figs. 1 and 2 is that in the apparatus of Fig. 2, a different biasing system has been provided for the pentode 72.

In particular, a cathode bias resistor 90 is connected between the cathode 82 of the pentode 72 and the ground terminal 38. In order to obtain grid bias for the pentode 72 of Fig. 2, a variable resistor 92, having a slidable contact member 94, is connected between the ground terminal 38 and the screen 78 of the pentode 72. As illustrated, the slidable contact member 94 is connected to the grid to thereby provide means for varying the magnitude of the grid voltage applied to the pentode 72, and thus means for varying the magnitude of the plate current flow through the pentode 72.

The biasing system provided for the pentode 72 of Fig. 2 maintains the magnitude of the plate current flow through the pentode 72 substantially constant, even though the magnitude of the voltage between the terminals 36 and 38 and the magnitude of the voltage applied to the B+ varies, since an increase in this line voltage effects an increase in the magnitude of the screen voltage which, in turn, tends to increase the magnitude of the current flow through the pentode 72. However, an increase in the line voltage effects an increase in negative grid voltage, to thereby tend to decrease the magnitude of the plate current flowing through the pentode 72, and, therefore, the increase in current flow is substantially offset by the decrease in current flow, and thus the magnitude of the plate current flow through the pentode 72 remains substantially constant, even though the magnitude of the line voltage, as applied between the terminals 36 and 38, and as applied to the terminal B+ varies. It is also to be noted that in the apparatus of Fig. 2, a single source of direct-current line voltage can be utilized. However, since the plate current of the pentode 72 flows through the resistor 90, the cathode bias on the pentode 72 is dependent upon the magnitude of this plate current flow, and thus, the regulating action is not as accurate as it is in the apparatus of Fig. 1.

Since numerous changes may be made in the above-described apparatus and circuits, and different embodiments of the invention may be made without departing from the spirit and scope thereof, it is intended that all the matter contained in the foregoing description or shown in the accompanying drawing shall be interpreted as illustrative and not in a limiting sense.

We claim as our invention:

1. In combination with a source of voltage having a pair of output terminals, a pulse circuit comprising a current path including a normally open switch device and a capacitor connected in series between said terminals, the series combination of a pulse forming network and a load impedance connected in shunt with said switch device and said capacitor, means for periodically closing said switch device, and a constant current device connected in shunt with said capacitor.

2. In combination with a source of voltage having a pair of output terminals, a normally open switch device and a capacitor connected in series between said terminals, the series combination of a pulse forming network and a load impedance connected in shunt with said switch device and said capacitor, means for periodically closing said switch device, a pentode vacuum tube having an anode, cathode and suppressor grid included therein, means connecting said anode to one side of said capacitor, means connecting said cathode to the other side of said capacitor, and a connection between said suppressor grid and said other side of the capacitor.

3. In combination with a source of voltage having a pair of output terminals, a pulse circuit comprising a normally open switch device and a capacitor connected in series between said terminals, the series combination of a pulse forming network and a load impedance connected in shunt with said switch device and said capacitor, means for periodically closing said switch device, a pentode vacuum tube having an anode, cathode and suppressor grid included therein, a connection between said anode and one side of said capacitor, an impedance element connecting said cathode to the other side of said capacitor, and a connection between said suppressor grid and said other side of the capacitor.

4. In combination with a source of voltage having a pair of output terminals, a pulse circuit comprising a gaseous discharge device and a capacitor connected in series between said terminals, the series combination of a pulse forming network and a load impedance connected in shunt with said discharge device and said capacitor, means for periodically firing said gaseous discharge device, a pentode vacuum tube having an anode and cathode included therein, control, screen and suppressor grids for said pentode vacuum tube, means connecting said anode to one side of said capacitor, means connecting said cathode to the other side of said capacitor, a connection between said suppressor grid and said other side of the capacitor, and means for applying bias voltages to said control and screen grids.

References Cited in the file of this patent

UNITED STATES PATENTS

| | | |
|---|---|---|
| 2,114,938 | Puckle | Apr. 19, 1938 |
| 2,498,636 | Bassett et al. | Feb. 28, 1950 |
| 2,573,558 | Fischman | Oct. 30, 1951 |
| 2,699,498 | Guenther | Jan. 11, 1955 |